(12) United States Patent
Saavedra

(10) Patent No.: US 11,578,476 B2
(45) Date of Patent: Feb. 14, 2023

(54) EVAPORATIVE COOLER AND MOISTURE CONDENSER WITH VAPOR RECOVERY AND METHOD

(71) Applicant: John Saavedra, Irmo, SC (US)

(72) Inventor: John Saavedra, Irmo, SC (US)

( * ) Notice: Subject to any disclaimer, the term of this patent is extended or adjusted under 35 U.S.C. 154(b) by 253 days.

(21) Appl. No.: 16/829,580

(22) Filed: Mar. 25, 2020

(65) Prior Publication Data

US 2021/0301505 A1    Sep. 30, 2021

(51) Int. Cl.
*E03B 3/28* (2006.01)
*F24F 13/22* (2006.01)

(52) U.S. Cl.
CPC ............... *E03B 3/28* (2013.01); *F24F 13/22* (2013.01); *F24F 2013/228* (2013.01)

(58) Field of Classification Search
CPC ......... E03B 3/25; F24F 13/22; F24F 2013/22; F28D 5/00; F28D 15/0266; F25B 39/02
See application file for complete search history.

(56) References Cited

U.S. PATENT DOCUMENTS

| | | | | |
|---|---|---|---|---|
| 5,940,270 A | * | 8/1999 | Puckett | F28D 15/0266 361/698 |
| 2010/0049338 A1 | * | 2/2010 | Schmitt | F24F 1/0043 165/104.19 |
| 2014/0174116 A1 | * | 6/2014 | Habeebullah | F24F 5/0035 29/890.035 |
| 2018/0135873 A1 | * | 5/2018 | Gold | F24F 11/30 |
| 2019/0082559 A1 | * | 3/2019 | Wu | G06F 1/18 |

OTHER PUBLICATIONS

Jovand, Closed loop swamp(evaporative) cooler, is it possible? (Feb. 11, 2020).*

* cited by examiner

*Primary Examiner* — Elizabeth J Martin
(74) *Attorney, Agent, or Firm* — Southeast IP Group; Thomas L. Moses

(57) ABSTRACT

An evaporative cooler which includes a sealed loop of conduit with a first portion in a space to be cooled and a second portion in a space where heat is rejected, a volume of working fluid, and a fan inside the conduit loop. The fan forces air over the working fluid to accelerate its evaporation, which requires heat. Evaporation creates vapor-enriched air which carries heat and is forced by the fan to the second portion. Within the second portion, the vapor-enriched air rejects the absorbed heat before being forced back to the first portion. In certain cases, a portion of the working fluid in the vapor-enriched air condenses out and drains or is pumped back to the first portion. In certain uses, the cooler provides cooling to an area. In other uses, the cooler captures vaporized water, producing an impurity-free condensate for removal or use.

20 Claims, 15 Drawing Sheets

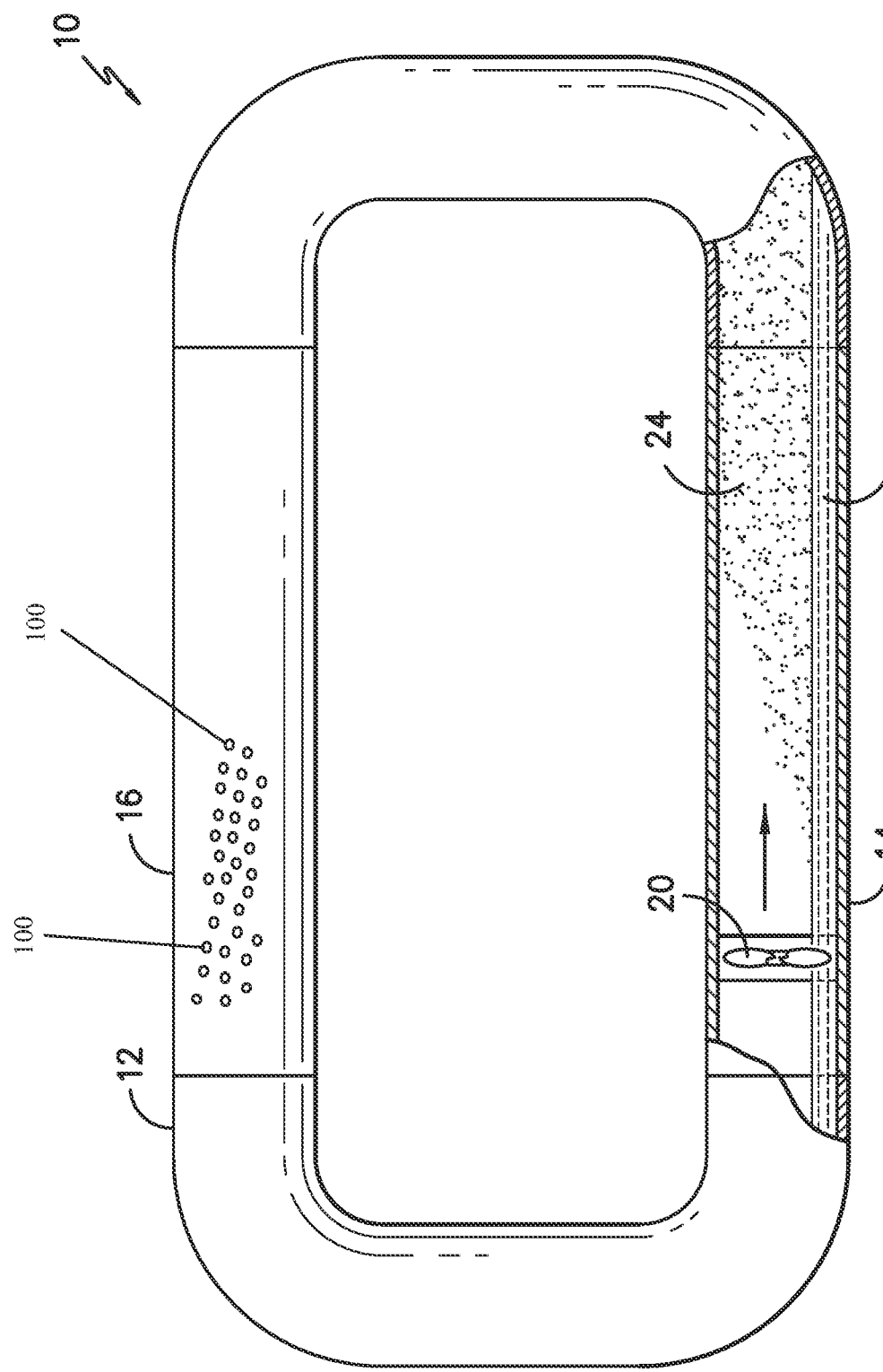
FIG. -1-

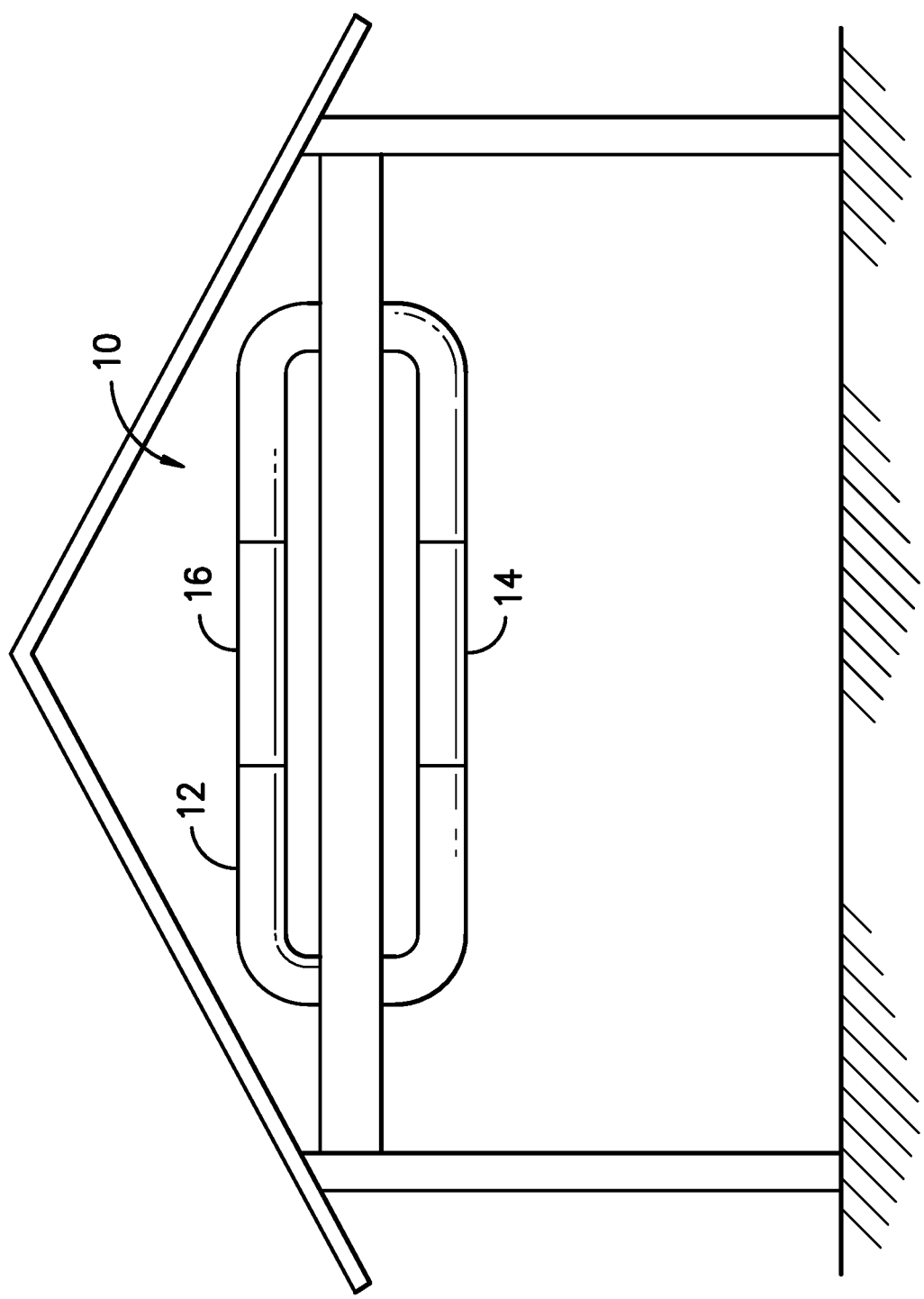
FIG. -2-

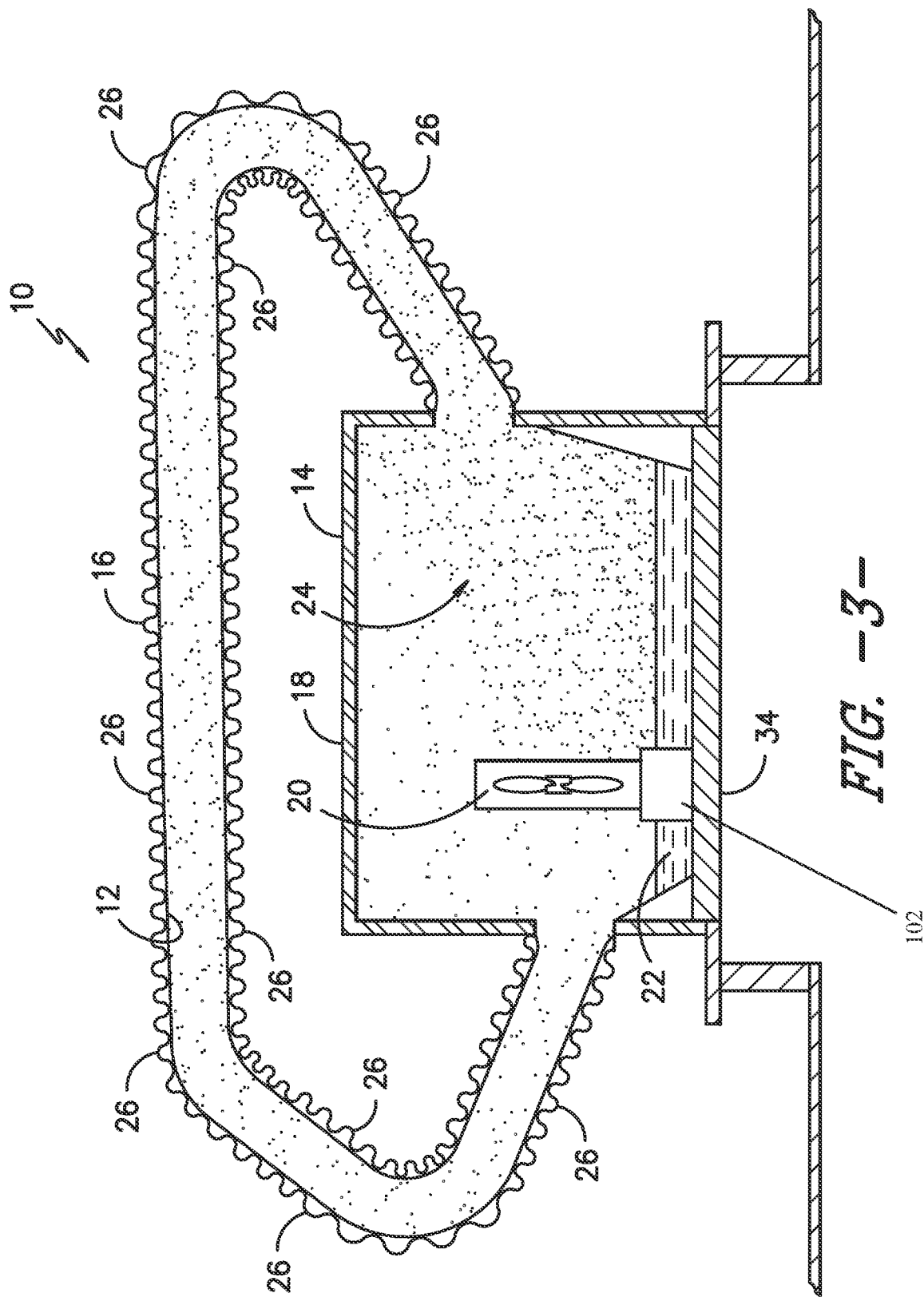
FIG. -3-

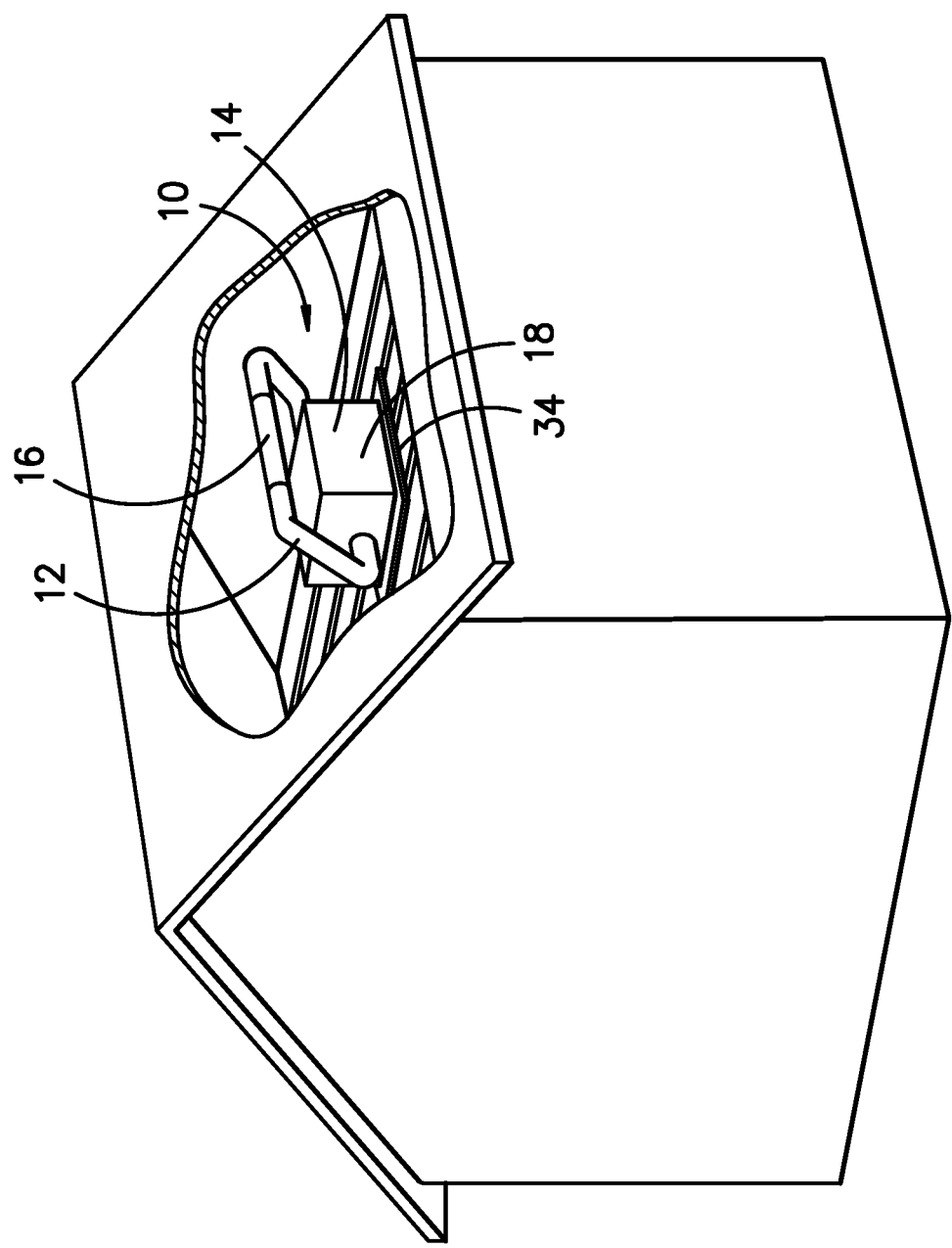
FIG. -4-

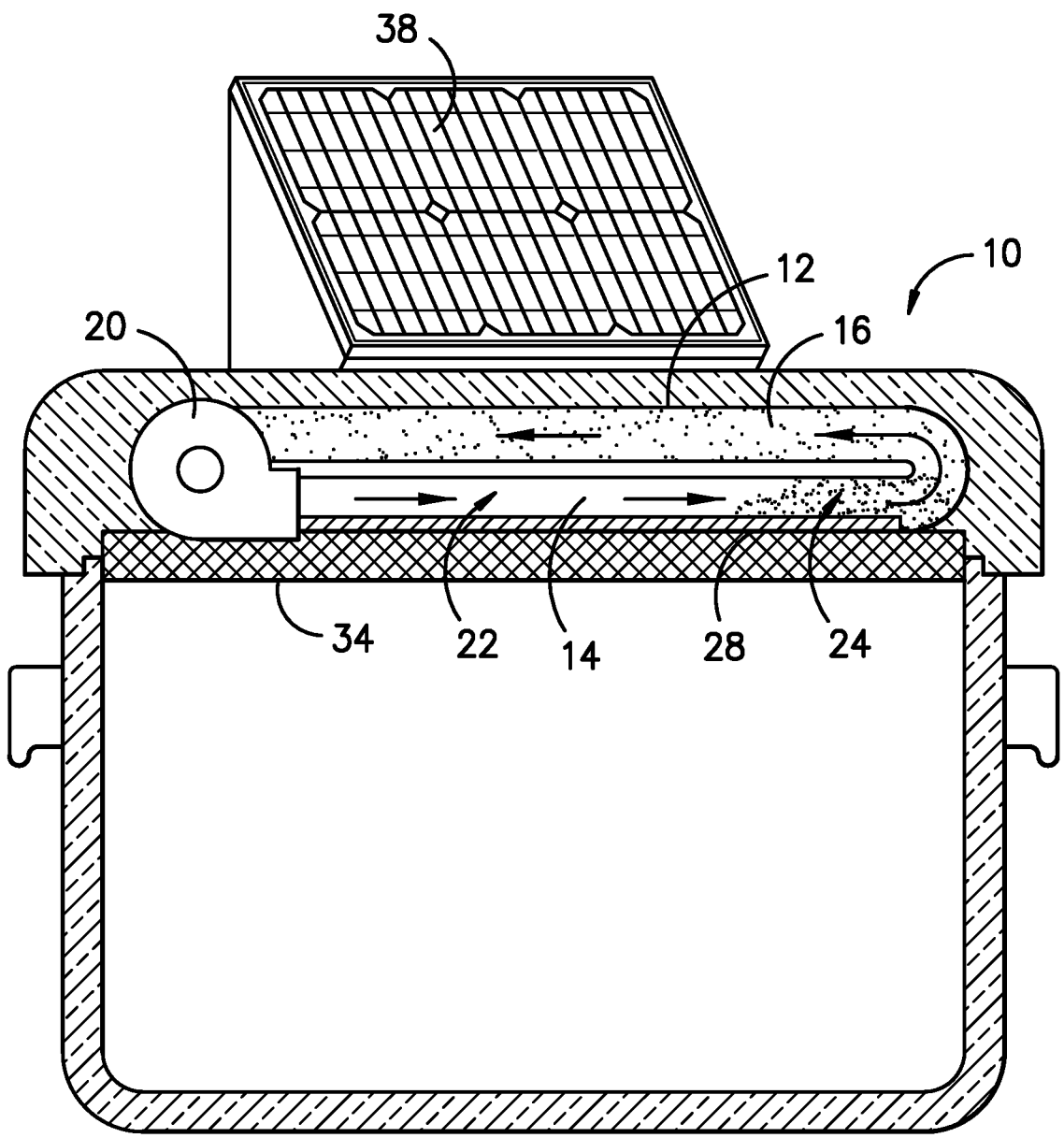
FIG. -5-

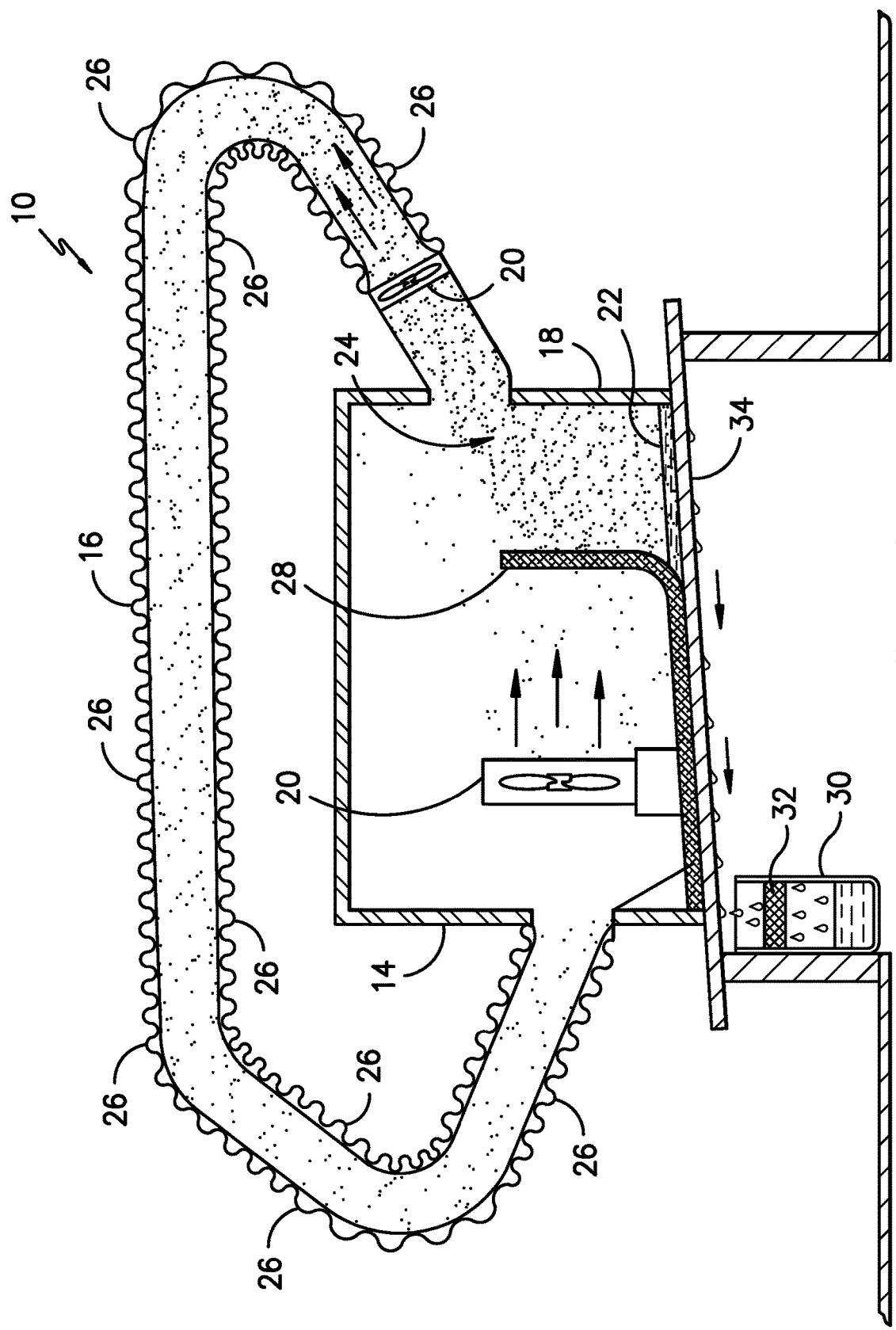
FIG. -6-

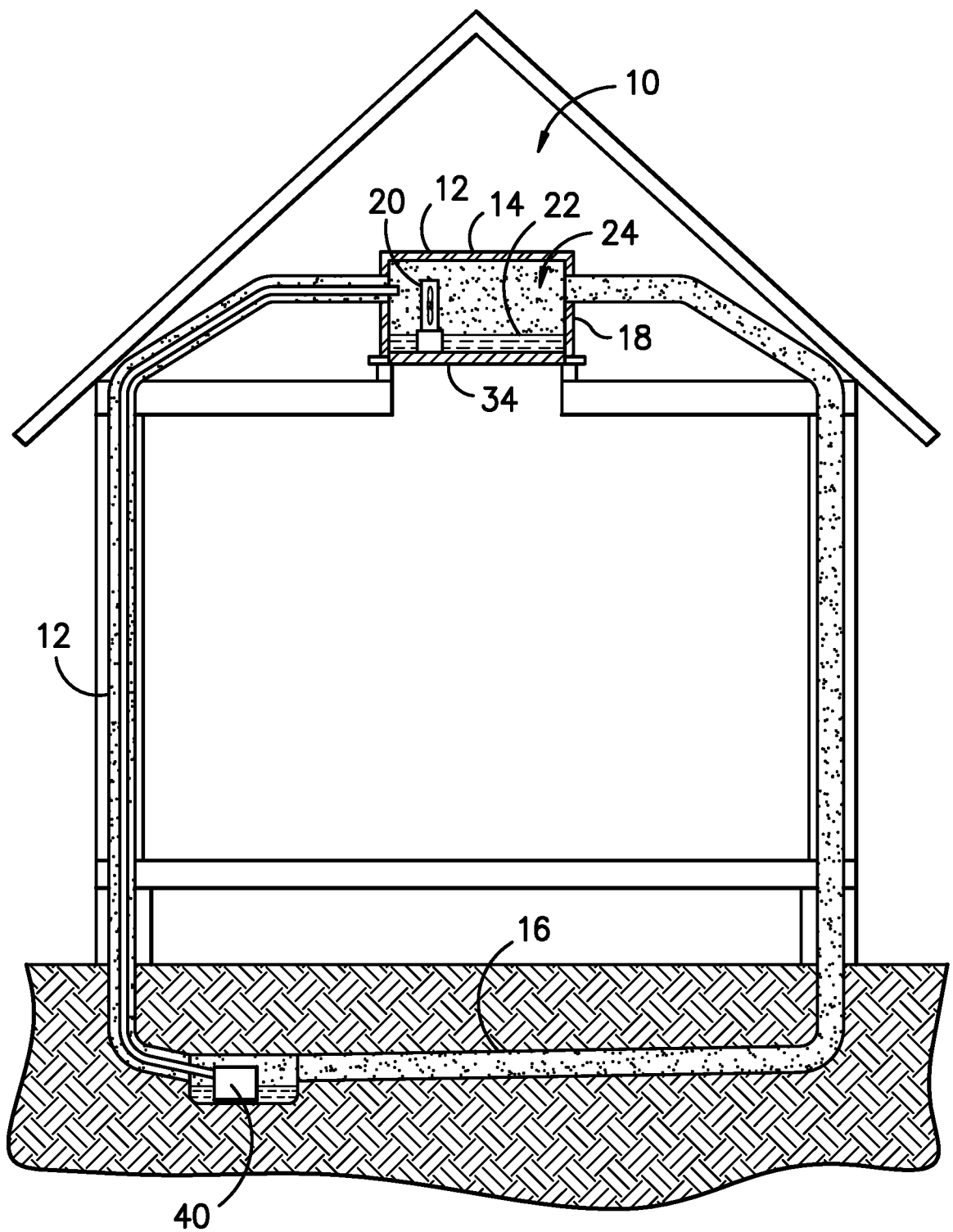
FIG. -7-

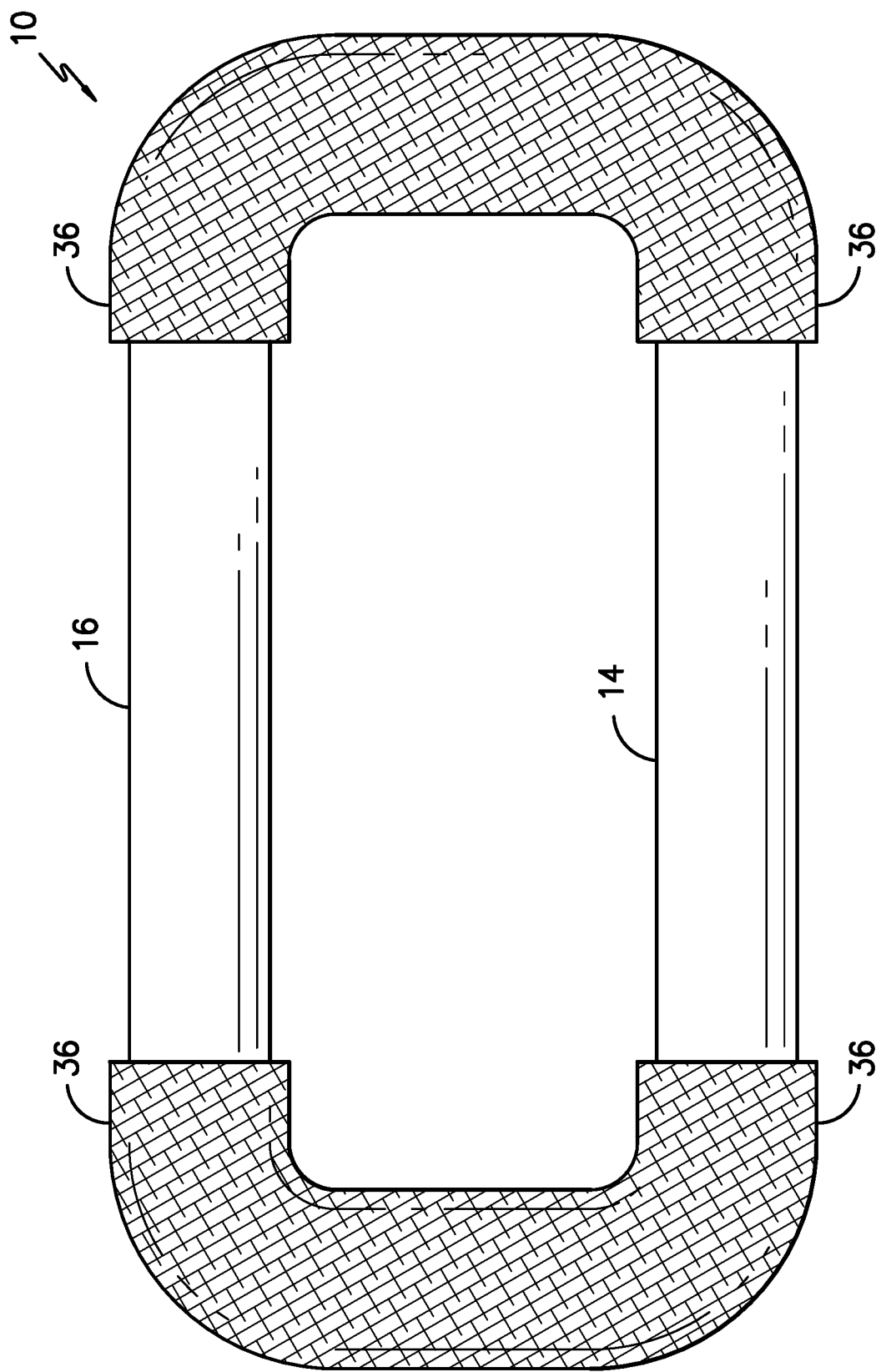
FIG. -8-

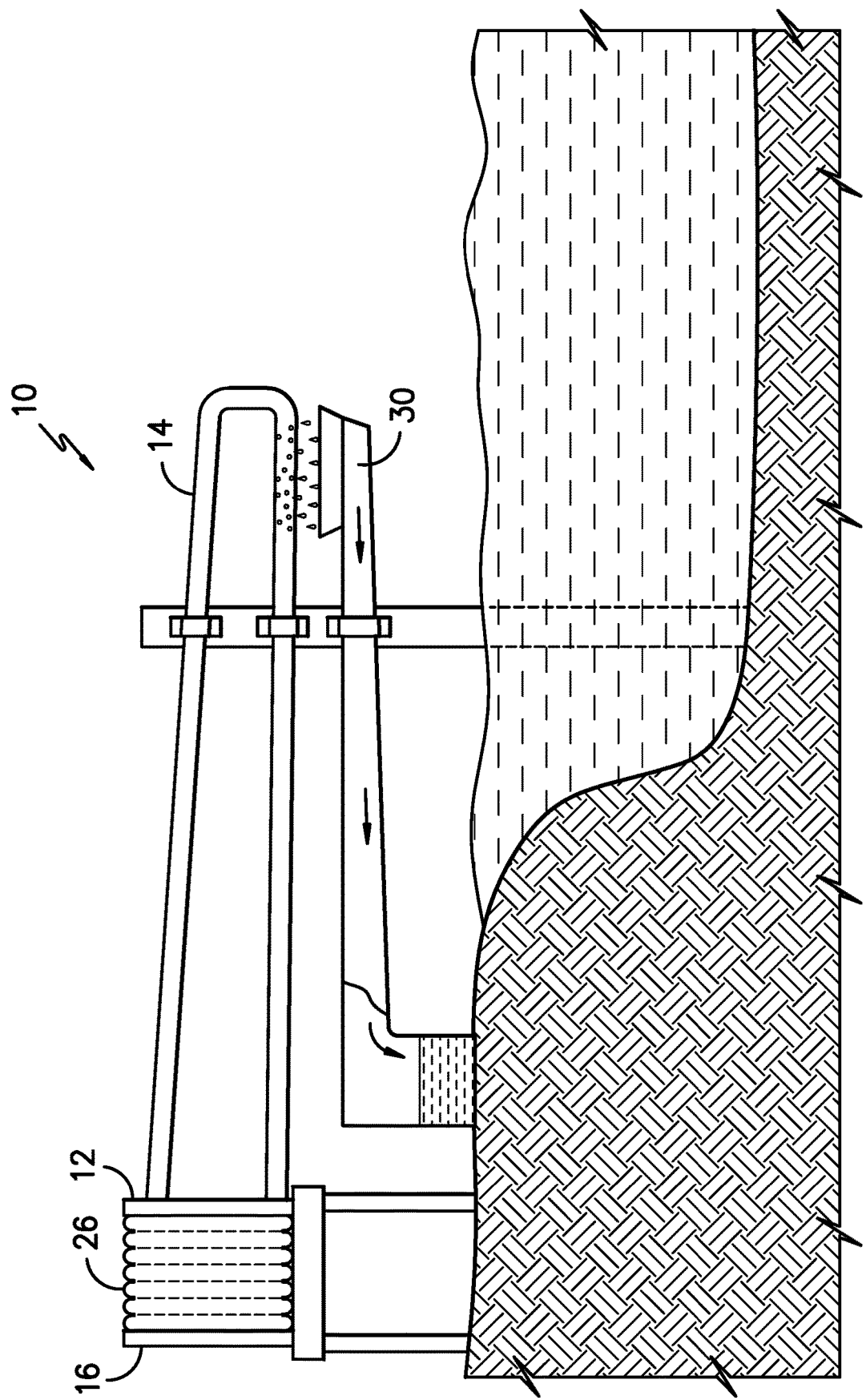
FIG. -9-

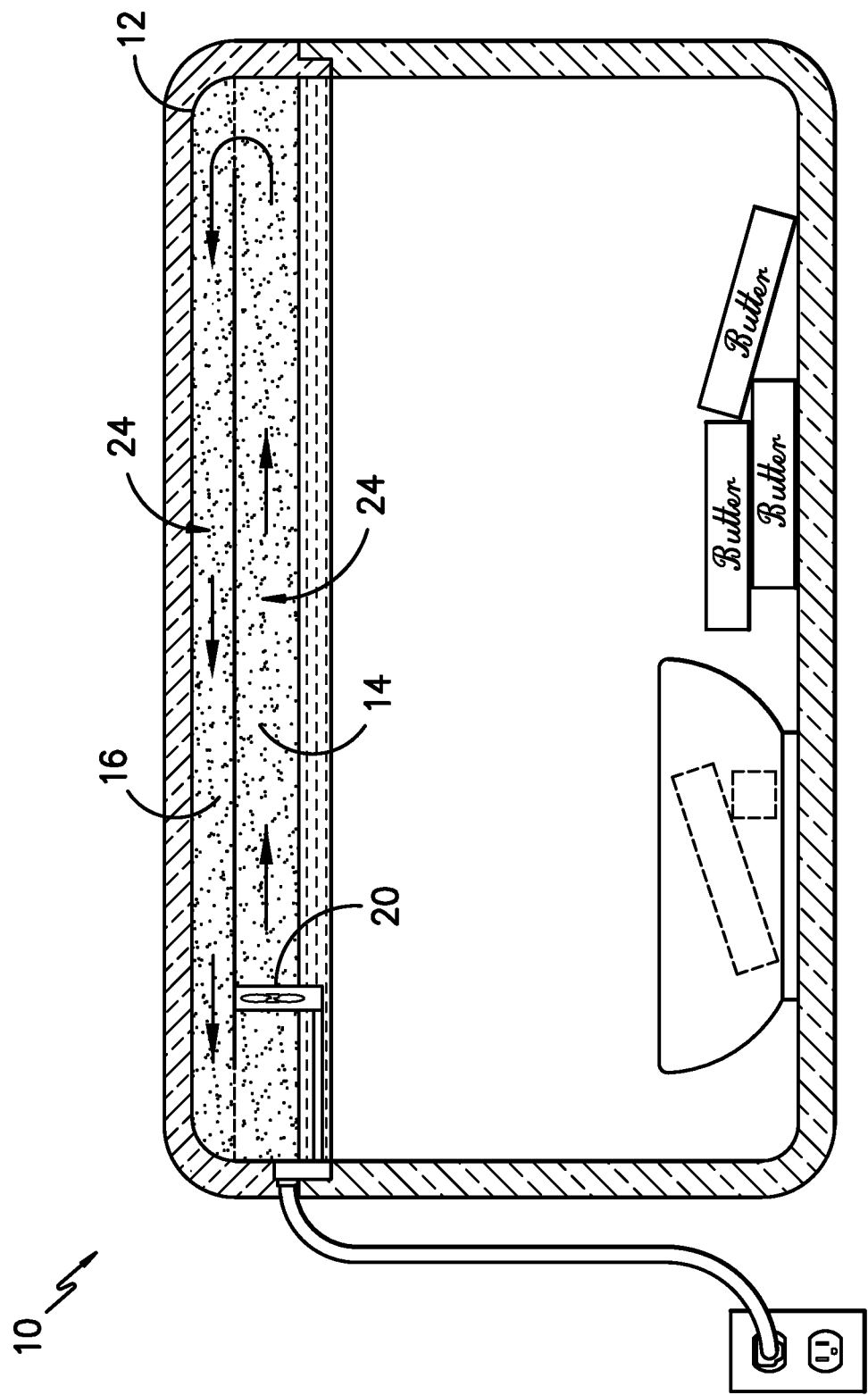
FIG. -10-

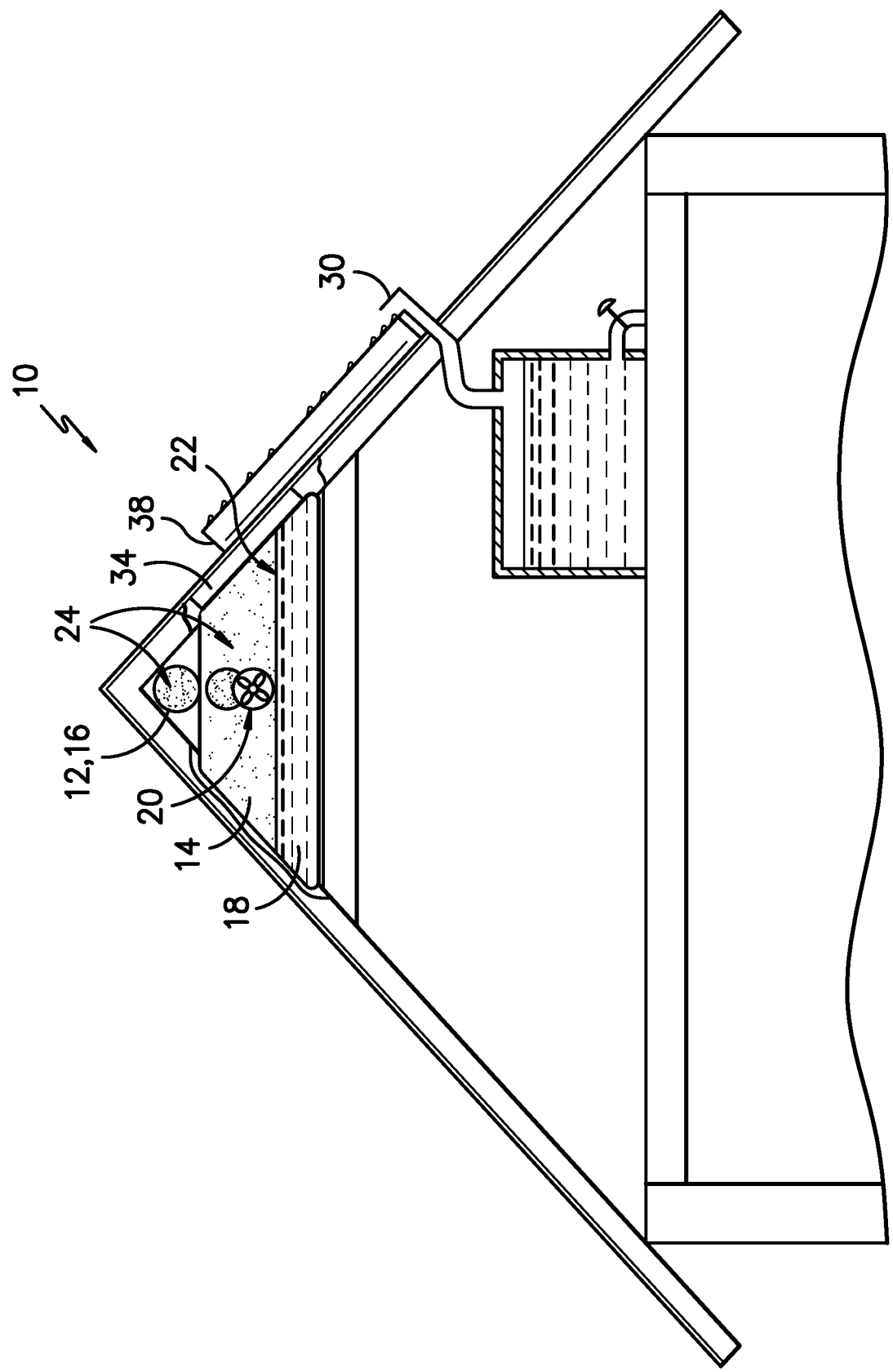
FIG. -11-

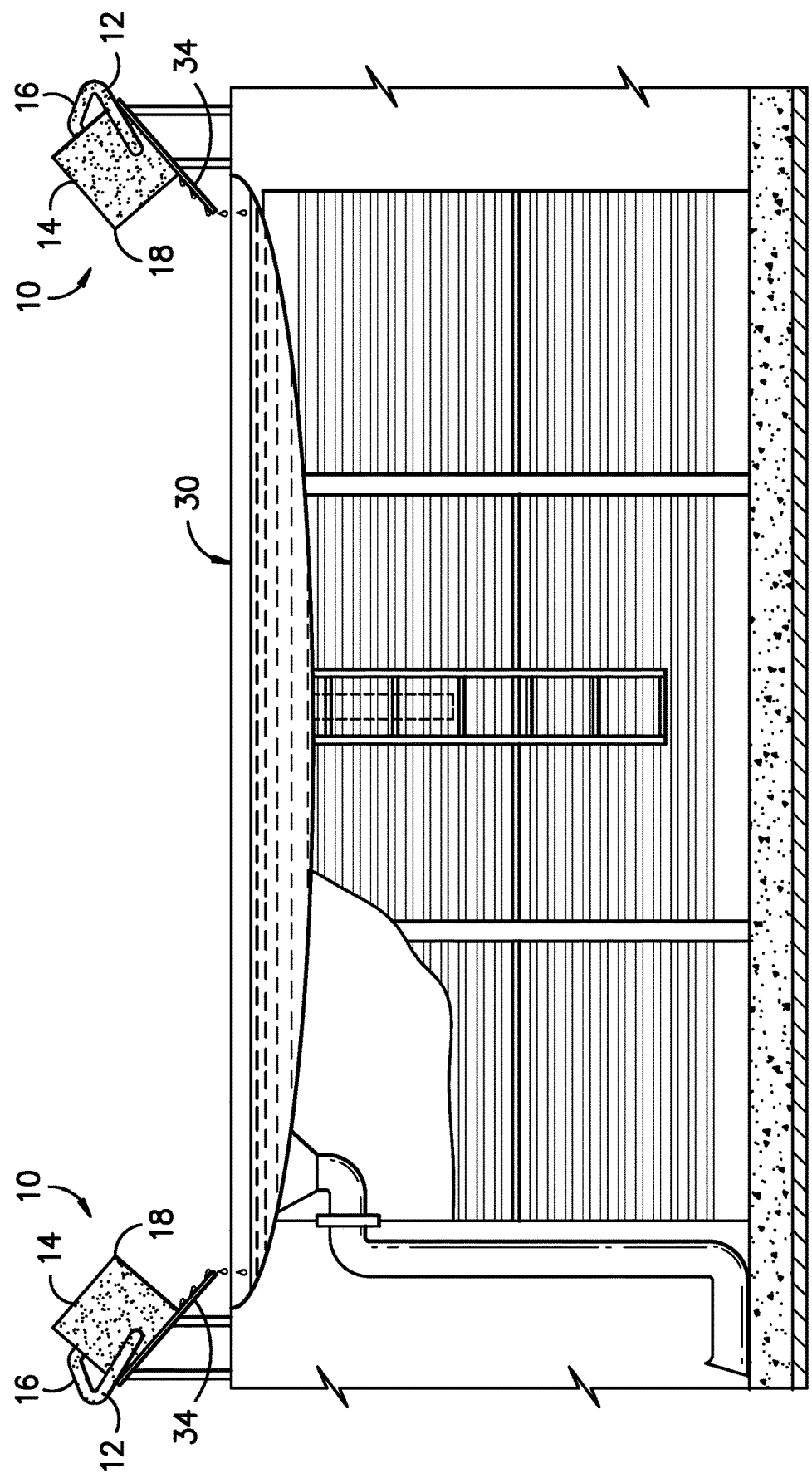
FIG. -12-

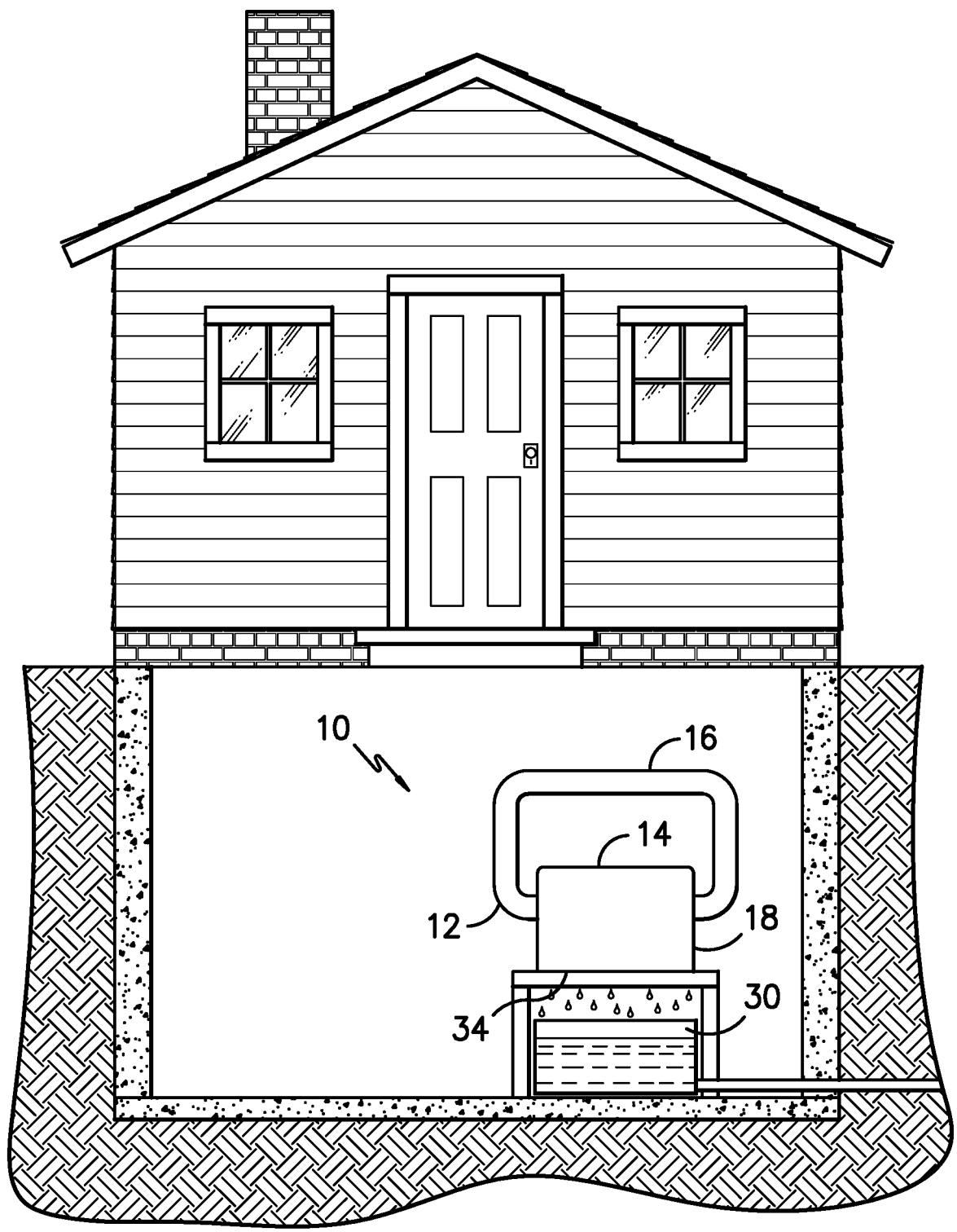
FIG. -13-

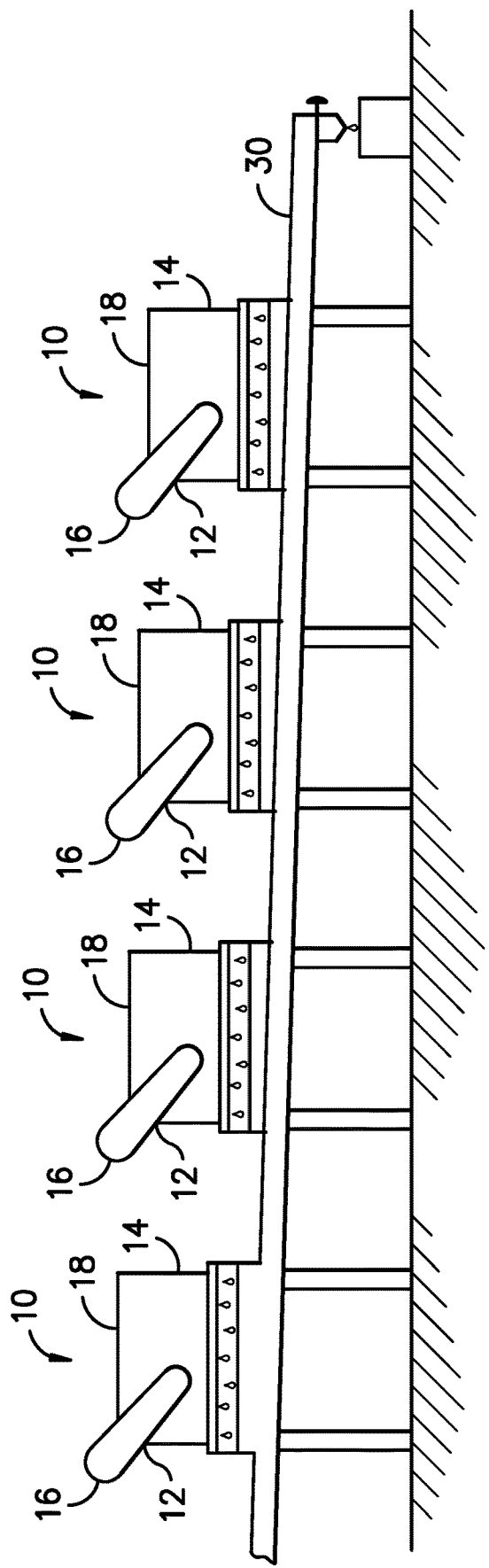
FIG. -14-

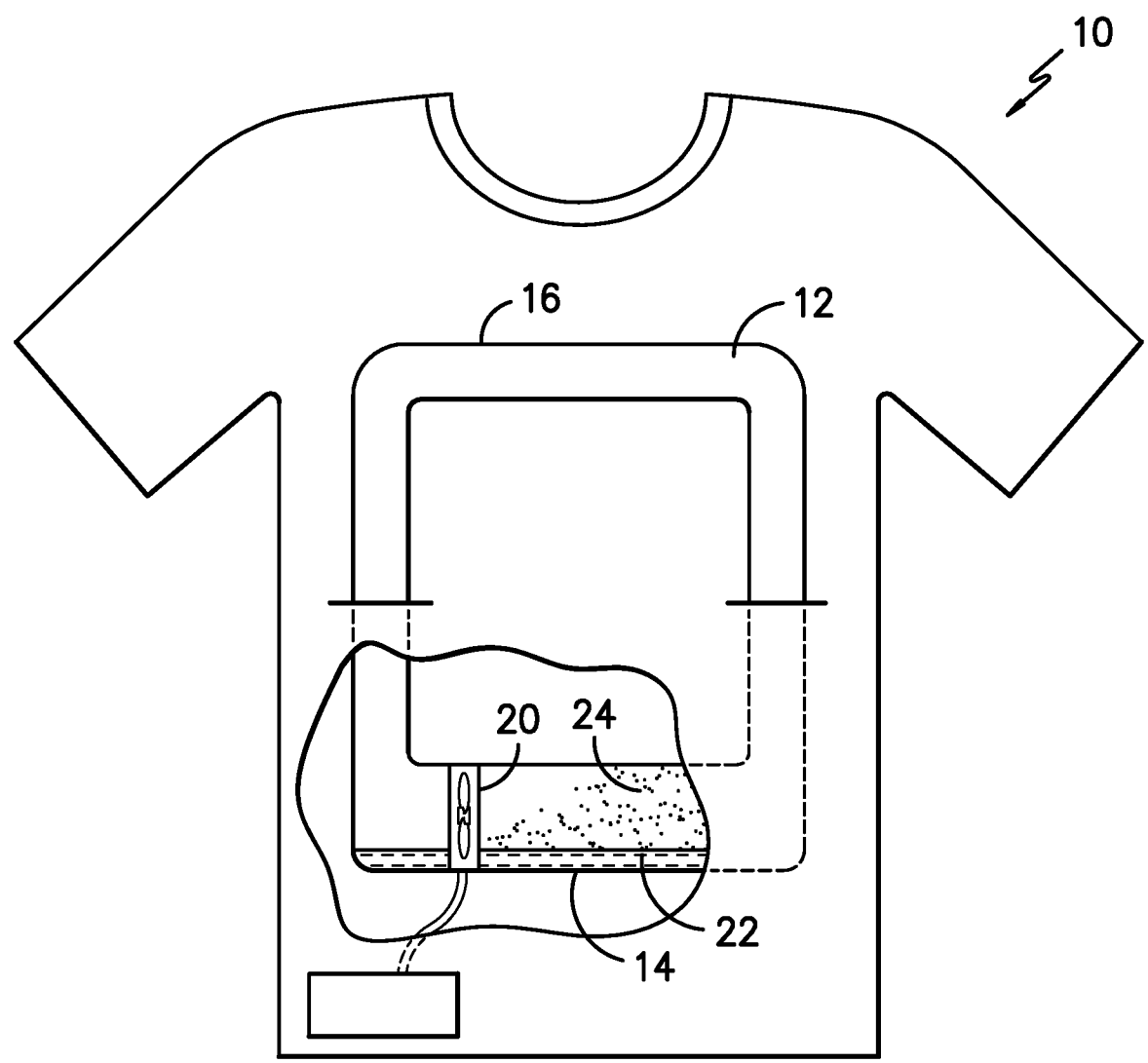
FIG. -15-

EVAPORATIVE COOLER AND MOISTURE CONDENSER WITH VAPOR RECOVERY AND METHOD

BACKGROUND

The comforts of air conditioning, refrigeration and access to clean water are considered necessities in our modern world. However, air conditioning, refrigeration, and even access to clean water rely heavily on an abundance of reliable energy and wealth to obtain, install, power, and maintain associated systems. In fact, it is common to have separate devices for providing air conditioning, refrigeration, and clean water, each with its own costs and energy needs. Further, conventional cooling and refrigeration systems are typically complex with many different parts, stages, and underlying principles, in addition to being costly and requiring reliable energy sources. Indeed, both air conditioning, refrigeration, and water purification systems typically have dedicated personnel to design, install, maintain, and repair them.

However, many portions of the world are too remote and impoverished to have access to the wealth, experience, and reliable energy sources necessary to provide, power, and maintain air conditioning, refrigeration, or clean water systems. Even in industrialized nations, many people are seeking ways to lower the costs and energy requirements necessary to provide, power, and maintain such systems. Efforts to lower the complexity, costs and energy requirements of air conditioning and refrigeration have been proposed which involve alternative cooling methods. One such method is evaporative cooling. Devices which utilize evaporative cooling, loosely identified as evaporative coolers, are known in the art. Evaporative coolers are generally far simpler and require less energy than typical air conditioning systems which utilize electro-mechanical vapor compression refrigeration or absorption refrigeration. However, in most climates, evaporative coolers increase indoor humidity—a factor in mold growth and upper respiratory infections—unless there is a continuous exhaust of treated air from indoor areas. Also, evaporative coolers generally require a constant supply of water to continuously operate. Furthermore, no known evaporative coolers are designed for the capture of airborne water vapor as part of their operation.

Consequently, it would be advantageous to provide a device and method which, in one or more aspects, overcomes the aforementioned limitations of the current state of the art, providing an alternative to electro-mechanical vapor compression refrigeration and absorption refrigeration while not requiring the continuous exhaust of treated air or a constant supply of water, while simultaneously dehumidifying and providing clean water for alternative uses.

BRIEF SUMMARY

The present invention, in one embodiment, comprises an evaporative cooling device and method that, in one or more aspects, does not require a continuous exhaust of treated air or a constant supply of water, and provides dehumidification and clean water. Moreover, the device and method of the present invention, in one or more aspects, is less expensive, and less complex than typical air conditioning and refrigeration devices. In certain aspects, the device and method provide cooling in a variety of applications without the need for a conventional electro-mechanical compressor, thereby lowering energy requirements, costs, and reducing the complexity of the apparatus. The device—in certain embodiments—may be used to lower energy requirements and costs by providing cooling to an enclosed climate-controlled space without requiring the utilization of a conventional electro-mechanical compressor, the continuous exhaust of treated air, or a constant supply of water. In addition, the present device and method may be used either in concert with or as a replacement to other heat transfer devices and methods, such as a heating, ventilation, and air conditioning (HVAC) system. Other advantages of one or more aspects will be apparent from the drawings and ensuing description.

In accordance with one embodiment of the present invention, an evaporative cooler is a sealed loop of conduit with a first portion in a space where heat is absorbed due to accelerated evaporation—producing cooling—and a second portion in a space where heat is rejected (transferred out of the system), a volume of working fluid, and a fan inside the conduit loop. In operation, the fan forces air over the working fluid to accelerate its evaporation. Evaporation requires heat to change fluid molecules into their gaseous state. Within the first portion, the heat required for evaporation of the working fluid is absorbed from the space surrounding the first portion. As the working fluid evaporates, air within the first portion becomes enriched with evaporating fluid. Thereafter, that vapor-enriched air—including its absorbed heat—is forced through the conduit and into the second portion, where heat can be rejected into the surrounding space before the air is returned to the first portion again. After this rejection, a portion of the working fluid may also condense out of the vapor-enriched air and return to the first portion. However, condensation of any of the working fluid form the vapor-enriched air is not strictly required. Thereby, heat is absorbed from one space, cooling it, and ultimately rejected in another space without use of an electro-mechanical compressor, continuous exhaust of treated air from an area, or constant supply of water to enable operation.

In various embodiments, the working fluid may be any of a number of fluids or mixes. For example, the working fluid may be methanol, ethanol, other alcohol, acetone, ether, water, isobutane, isopentane, or an aqueous ammonia solution. However, it is recognized that preference may be given to fluids having higher vapor pressures and lower boiling or freezing points. Additionally, a working fluid may be chosen based on any number of other factors to suit the application/use. For example, a working fluid may be more desirable based on its viscosity, expense, toxicity, inability to chemically react with materials, renewability, sustainability, mass, and flash point. Thereby, a particular working fluid may be chosen which allows for faster evaporation or condensation, as circumstances dictate. Furthermore, in particular embodiments the cooler may also produce dehumidification and clean water from condensate as an addition to or a completely separate use from the above cooling process use.

DESCRIPTION OF THE DRAWINGS

These and other features, aspects, and advantages of the present invention will become better understood with regard to the following description, appended claims, and accompanying drawings where:

FIG. 1 is an elevation view of one embodiment of an evaporative cooler having a loop of conduit with two portions—a first portion where a portion of working fluid is evaporated, absorbing heat, and a second portion from which heat is rejected or transferred out of the system—with a cutaway portion in the first portion to show the fan, working fluid, and vapor-enriched air created by the evaporation;

FIG. 2 is an elevation view of a house with a cutaway to show the evaporative cooler of FIG. 1 installed in a building so the portion which absorbs heat is located in a room along the ceiling and the portion from which heat is rejected is located in an attic;

FIG. 3 is an elevation view of one embodiment of an evaporative cooler having a vessel as a part of the conduit loop with the cooler with a cutaway to show the interior of both the vessel and conduit having a cylindrical shaped axial-flow fan, working fluid which evaporates into vapor-enriched air and cycles through the conduit back to the vessel;

FIG. 4 is a perspective view of one embodiment of an evaporative cooler having a vessel and conduit located in a house and being used to remove heat from the interior of the house;

FIG. 5 is an elevation view of one embodiment of an evaporative cooler located in the lid of an ice chest with a cutaway to show the cooler being used to remove heat from the interior of the ice chest and having a centrifugal fan and moisture pad and where the fan is powered by a photovoltaic solar panel;

FIG. 6 is an elevation view of one embodiment of an evaporative cooler having an additional fan within a conduit to force vapor-enriched air through the conduit, a moisture pad within the vessel, and a condensed moisture collector and purification mechanism affixed below a portion of the cooler;

FIG. 7 is an elevation view of one embodiment of an evaporative cooler with a cutaway to show the interior of a vessel and conduit having a portion of the conduit located underground and a pump and line for the return of any condensed working fluid;

FIG. 8 is an elevation view of one embodiment of an evaporative cooler having a loop of conduit with two portions—a first portion where a portion of working fluid is evaporated, absorbing heat, and a second portion from which heat is rejected—with thermal insulation covering segments of the conduit;

FIG. 9 is an elevation view of one embodiment of an evaporative cooler utilized near a body of saltwater to produce condensed moisture largely free of salt;

FIG. 10 is an elevation view of one embodiment of an evaporative cooler located in a box and being used to remove heat from the interior of the box to keep butter at a particular temperature with arrows indicating the direction of vapor flow as the fan operates;

FIG. 11 is an elevation view of one embodiment of an evaporative cooler located on a platform at the top of an attic, so that the heat absorbing section of conduit contacts a solar panel to cool the panel and encourage the condensation along its surface and where the condensation may be collected in a tank within the attic to be dispersed into the house, augmenting the house's water supply;

FIG. 12 is an elevation view of one embodiment of evaporative coolers located around the perimeter of a water tank having a rainwater collection reservoir on top so that condensation formed on portions of the cooler may also collect in the reservoir to be added to the tank or used separately;

FIG. 13 is an elevation view of one embodiment of an evaporative cooler located in a basement so that humidity in the basement may be reduced as condensation forms on a portion of the cooler and falls into a collector and drained away;

FIG. 14 is an elevation view of a collection of evaporative coolers of one embodiment having networked condensed moisture collectors, the collection being known as a water farm, so that moisture produced is consolidated at a single location for collection and retrieval; and FIG. 15 is an elevation view of one embodiment of an evaporative cooler disposed in an article of clothing so that heat may be removed from a user's skin and expelled to the surroundings thereof.

| REFERENCE NUMERALS | | | |
|---|---|---|---|
| 10 | Evaporative Cooler | 12 | Conduit |
| 14 | First Portion | 16 | Second Portion |
| 18 | Vessel | 20 | Fan |
| 22 | Working Fluid | 24 | Vapor-Enriched Air |
| 26 | Fins | 28 | Moisture Pad |
| 30 | Condensed Moisture Collector | 32 | Purification Mechanism |
| 34 | Vessel Base Plate | 36 | Thermal Insulation |
| 38 | Photovoltaic Solar Panel | 40 | Pump |

DETAILED DESCRIPTION OF THE INVENTION

Definitions

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

The term "fluid" is used herein within the usual scientific meaning of the word to include both liquids and gases. The term "condense" is used herein within the usual scientific meaning of the term, i.e. to change from a gas or vapor phase into a liquid phase. Further, the term "condensation" is used herein within the usual scientific meaning of the word to mean the change of the physical state of matter from gas or vapor phase into liquid phase. Lastly, the term "fan" is used herein to also include blowers and air pumps, including those similar in design to those used in aquariums.

Cooler and Method of Use Generally

As shown in FIGS. 1-7, the present evaporative cooler 10, in general, includes a sealed loop of conduit 12 with a first portion 14 in a space from which heat will be absorbed, producing cooling, and a second portion 16 in a space where heat will be rejected, a volume of working fluid 22, and a fan 20 inside the conduit loop. In operation, the fan 20 forces air over the working fluid 22 to accelerate its evaporation within the first portion 14. Heat required for the evaporation is absorbed from the space surrounding the first portion 14 of conduit 12. As the working fluid 22 evaporates, vapor-enriched air 24 is created which carries the heat required for the evaporation. This vapor-enriched air 24 is forced by the fan 20 through the conduit 12 to the second portion 16 where some of the heat absorbed in the first portion 14 can be rejected out into surrounding space. After the second portion 16, the vapor-enriched air 24 is further forced to return to the first portion 14. Also, as heat is rejected from the vapor-enriched air 24, a portion of the working fluid 22 may condense out to be returned to the first portion again 14, as a liquid. However, condensation of any portion of the working fluid 22 is not strictly required.

First Embodiment

As in FIGS. 1 and 2, a first embodiment f the evaporative cooler 10 comprises a loop of conduit 12 having first portion 14 and a second portion 16 made of aluminum while the remainder of the conduit is made of or insulated with polyurethane. Polyurethane has a low thermal conductivity coefficient and can help reduce thermal transfer to portions of the conduit 12 other than the first and second portions 14, 16. Also, the first embodiment includes an alcohol working fluid 22 within the conduit 12, generally located within the first portion 14. A cylindrical shaped axial-flow fan 20 is disposed within the conduit 12 to accelerate evaporation of the alcohol working fluid 22 and force movement of vapor-enriched air 24 through the conduit 12.

In operation, the conduit 12 is placed, or installed, so a first portion 14 is located inside a space to be cooled, such as along the ceiling of a room, and the second portion 16 is located within a space where heat may be rejected, such as an attic, as in FIG. 2. As the fan 20 blows over the alcohol working fluid 22 in the first portion 14, evaporation of a portion of the working fluid 22 is accelerated. As working fluid 22 evaporates, heat required for the accelerated evaporation is absorbed from the space surrounding the first portion 14, cooling that space. Also, as working fluid vapor mixes with other air in the first portion 14, vapor-enriched air 24 is created. The fan 20 forces the vapor-enriched air 24, carrying the heat absorbed during evaporation from the first portion 14, through the conduit 12 into the second portion 16. Within the second portion 16, the vapor-enriched air 24 rejects some of its heat through the conduit 12 to the space surrounding the second portion 16. Thereafter, the vapor-enriched air 24 is forced back into the first portion 14 to complete the cycle. As the vapor-enriched air 24 is forced through the conduit 12, a portion of its working fluid 22 may condense into liquid inside the conduit 12 and return to the first portion 14 under the force of gravity due to the arrangement of the conduit 12.

Alternative and Additional Elements

Conduit

As in FIGS. 1-5, the conduit 12 of the cooler 10 forms a hermetically sealed loop through which vapor-enriched air 24 may flow, as the fan 20 operates. Though the conduit 12 of the first embodiment is shown as circular tubing, the conduit 12, its portions or any segment, may be any size or shape desirable to facilitate the flow of the vapor-enriched air 24. For example, in the embodiment shown in FIG. 5, the conduit 12 has a rectangular cross section so it may be located within the lid of an ice chest. Further, the size of the first and second portions 14, 16 may be small or large relative to each other and/or the remainder conduit 12, as desired. For example, the first portion 14—the portion of the conduit through which heat may pass into the vapor-enriched air 24—may be large relative to the remainder of the conduit 12 to maximize the absorption of heat into the vapor-enriched air 24. Also, to maximize the exchange of heat from the vapor-enriched air 24, the second portion 16 may be large relative to the remainder of the conduit 12. Indeed, it is foreseen that in one embodiment, the first and second portions 14, 16 of the conduit 12 make up the entirety of the conduit 12.

While the first and second portions 14, 16 and remainder of the conduit 12 are disclosed as being made with aluminum and polyurethane, respectively, other materials with desirable characteristics might also be used. For example, the first and second portions 14, 16 might be made of copper, tungsten, zinc, iron, nickel, or any other material—including various polymers, ceramics, or the like—having a sufficiently high thermal conductivity coefficient to allow the transfer of heat from or to the space surrounding the each portion 14, 16. Also, the remainder of the conduit 12 may be made of polyimide (PA), polyimide (PI), polycarbonate (PC), high density polyethylene (HIVE), polyvinylidene fluoride (PVDF), polyvinylchloride (PVC), polytetrafluoroethylene (PTFE), polystyrene (PS), or any other material—including various metals, ceramics, or the like—having a sufficiently low thermal conductivity coefficient to reduce the transfer of the heat to space surrounding other portions beyond the first and second portions 14, 16. Though the above preference is noted for materials relative to their thermal conductivity coefficients, the conduit 12 may be made of virtually any material which allows for the operation of the cooler 10 as described.

The conduit 12 may include thermal insulation 36 covering various segments to reduce or prevent heat transfer or condensation outside of select specific desirable areas, as in FIG. 8. The thermal conductivity of the conduit material, outside of the first and second portions, 14, 16, may not need to be low or as low to prevent thermal transfer in embodiments including thermal insulation 36. Instead, the restriction on heat transfer may be due in whole or in part to the low thermal conductivity of the thermal insulation material 36 itself. Examples of thermal insulation 36 materials may comprise those described above as useful for the remainder of the conduit 12 outside of the first and second portions 14, 16.

Further, as in the first embodiment, the conduit 12 may be placed so that any condensed working fluid 22 may flow back into the first portion 12 under the simple force of gravity, as in FIGS. 2-4. However, in instances where gravity cannot support the return of the working fluid 22, one or more additional lines and pumps 40 may be affixed between the section of conduit 12 where condensed working fluid 22 accumulates and the first portion 14 serves to return such working fluid thereto, as shown in FIG. 7.

The first portion 14 of the conduit 12 may be formed into a vessel 18, having an inlet, outlet, and a base plate 34, wherein the fan 20 may be disposed and/or in which some portion of the working fluid 22 may collect to be stored prior to its evaporation or while the cooler 10 is not in operation. For example, in FIGS. 3 and 6, the first portion 14 is a vessel 18 having an aluminum base plate 34 through which heat may be absorbed from the surrounding space. Though only the base plate 34 is described as being made of metal above, other surfaces of the vessel 18 may be composed of aluminum or any other material—including polymers, ceramics, or the like—with a sufficiently high thermal conductivity coefficient to enhance heat transfer.

Additionally, other elements and features may be used on or with the first and second portions 14, 16 of conduit 12 to enhance heat transfer between the vapor-enriched air 24 and spaces surrounding each. For example, an additional fan may be disposed so it blows air across the exterior of one or both of the portions 14, 16 to enhance heat transfer. Also, the surfaces of the first and second portions 14, 16 may also include fins, spikes, dimples 100 or some combination to enhance the transfer of heat.

The fins, spikes, or dimples may be virtually any shape and size. The exterior surfaces of the first and second portions 14, 16 may appear ribbed or have long narrow ribbon-like extensions away from the conduit surface to increase its surface area. For example, in FIG. 3, the second portion 16 has fins 26, i.e. ribs, to facilitate the transfer of heat. While fins 26 are shown on the exterior in FIG. 3, the fins 26, ribbons, or spikes may also be along an interior portion of the conduit 18. Similarly, a protrusion may extend away from one or both of the first and second portions 14, 16. For example, in the embodiment having a vessel 18 with a base plate 34 as the first portion 14, the base plate 34 may have a larger surface area than that defined by the perimeter of the first portion 14 in contact with the base plate 34. Portions of the base plate 34 itself extend away from the first portion 14, as in FIGS. 3 and 5. In addition, a separate thermal heat exchanger may also be placed in thermal communication with one or both of the first and second portions 14, 16 to also enhance heat transfer.

Lastly, to enhance the transfer of heat from the vapor-enriched area to an area surrounding the second portion 16, the conduit may be arranged so that the second portion 16 is in a relatively "cooler" area. Examples of cooler areas include those located in shade, inside barrels of water, and underground as in FIG. 7.

Fan

As shown in FIG. 1, the fan 20 may be disposed within the conduit 12 to accelerate evaporation of the working fluid 22 and cycle the vapor-enriched air 24 through the loop from the first portion 14 into the second portion 16 and back to the first portion 14. The fan 20 may be one of a variety of shape and sizes, depending upon the application. For example, in FIG. 1, the fan is a standard cylindrical shape "axial-flow" style and sized so that it fits within the conduit 12. Alternatively, in FIG. 5, the fan 20 is a rectangular shaped centrifugal fan sized to accommodate its inclusion in the lid of an ice chest. Furthermore, the fan 20 of the present cooler 10 may have adjustable operational speed which might be controlled by a user manually or by an automated system, in various embodiments. Indeed, the fan 20 may be connected to a controller 102, such as a computer, a computer microcontroller, programmable logic controller (PLC), or the like, which sets the condition, or speed, of the fan 20 based on conditions within or surrounding the cooler 10 itself. For example, the controller may have or be signaled by a timer, thermostat, or hygrometer to control when and how the fan 20 operates. Thus, operation of the cooler 10 may be more energy efficient.

Additionally, in certain embodiments, the cooler 10 may have one or more additional fans 20 located within the conduit 12 loop, as in FIG. 6. The additional fans 20 force vapor-enriched air 24 through the loop. The fan 20 may receive power from a variety of sources, including batteries, solar panels 38, a power grid, hand-crank generator, a bellows, or some combination thereof. For example, in FIG. 5 the cooler 10 has a photovoltaic solar panel 38 adjustably mounted to the lid of an ice chest so that its angle relative to the lid can be adjusted to facilitate its absorption of solar radiation and provide power to the fan 20.

Working Fluid

As shown in FIGS. 1, 3, and 5-7, a volume of working fluid 22 is located in the first portion 14 of the conduit 12. The accelerated evaporation of the working fluid 22 produces vapor-enriched air 24 which carries the heat required for such evaporation. In the first embodiment, shown in FIG. 1, an alcohol is used as the working fluid 22. However, many additional fluids may be utilized as a working fluid 22. For example, water may be used, as it is used in other evaporative cooler applications. Additionally, fluids such as ether, acetone, isobutane, isopentane, methanol, ethanol, or another alcohol might also be used and may be considered more desired as working fluids 22 due to their higher vapor pressure which allows for faster evaporation. The choice of working fluid 22 may be based on the desired application and operation of the cooler 10. For example, a working fluid 22 may be selected which has both the ability to vaporize quickly and the ability to condense at temperatures surrounding the conduit 12. Also, a working fluid 22 may be selected based on other factors, such as viscosity, expense, toxicity, renewability, sustainability, mass, flash point, or inability to chemically react with the conduit 12, moisture pad 28, or base plate 34 materials.

Moisture Pad

In additional embodiments, evaporation of the working fluid 22 within the conduit 12 may be enhanced through the use of a moisture pad 28, as shown in FIGS. 5 and 6. For example, a portion of the moisture pad 28 may contact the volume of working fluid. 22 within the first portion 14 to absorb such and if placed generally within the operating path of the fan 20, evaporation can be further accelerated. Evaporation is accelerated as the fan 20 forces air over or through the moisture pad. 28 because of the increased surface area of working fluid 22 in contact with the blown air.

While the moisture pad 28 in the embodiment above was placed within the operating path of the fan 20, the moisture pad may be placed in any location and in any orientation with respect to the fan 20. Furthermore, the moisture pad 28 may be placed within another part of the conduit 12, instead of within the first portion 14. However, placement of the moisture pad 28 within another part of the conduit 12 may require additional elements to ensure absorption of the working fluid 22 into the moisture pad, unless working fluid may collect within the same part of the conduit 12. A tube, hose, or channel, and possibly a pump, may be utilized to ensure contact and absorption of the working fluid 22 into the moisture pad 28. Additionally, the moisture pad 28 may be any shape or size to allow a portion of it to contact the working fluid 22 and a portion of it to be within the operational area of the fan 20.

The moisture pad 28 may be made with almost any moisture wicking material. For example, the moisture pad 28 may be made of wool, polypropylene, nylon, polyester, silk, rayon, cotton, or some combination thereof as these materials provide superior properties for absorption of fluid. However, any material sufficient to allow wicking may also be utilized. Indeed, the moisture pad 28 may even be made with paper.

Condensed Moisture Collector

The present cooler 10, in certain embodiments, may further include a condensed moisture collector 30 which captures moisture which may condense on outside portions of the device 10, as in FIG. 6. For example, condensed moisture forming on the outside of the conduit 12 may be captured by a container as it falls therefrom. Alternatively, condensed moisture may be collected by any receptacle, vessel, canister, can, box, holder, repository, or other structure sufficient to collect water. In use, condensed moisture may form on an outside portion of the present cooler 10 due to the differences in temperatures between that portion of the device and the surroundings. As such moisture forms, water is removed from the air and humidity is reduced in the surrounding area. The condensed moisture may fall or flow from the outside portion of the cooler 10 into a condensed moisture collector 30. The condensed moisture collector 30 may also remove such collected moisture from the surroundings, such as by being connected to a drainage system, to prevent the moisture from evaporating and increasing the humidity of the surroundings again. Accordingly, the condensed moisture collector 30 may be useful where the present cooler 10 is utilized in areas in which increased humidity or wetness may not be desired or may cause damage.

The present cooler 10 may be utilized to produce desalinated water in one embodiment by having the cooler 10 or particular portions thereof located near a body of saltwater during operation. For example, the first portion 14 of the conduit 12 and condensed moisture collector could be located above a saltwater bay, as in FIG. 9. During operation, the cooling that occurs along the surface of the first portion 14 as heat is absorbed therein causes condensed moisture to form and be captured by the condense moisture collector 30. In this fashion, desalinated water may be produced in areas where saltwater is predominately available and is even part of the water table. Although the above is concerned with producing condensed water without salt, the present cooler 10 may be used to produce condensed moisture without or largely free of a number of other contaminants or impurities when set up in a similar way relative to a body of water containing such contaminants or impurities.

Purification Mechanism

Though the condensed moisture may be largely free of contaminants and impurities, as described above, certain embodiments of the cooler 10 may employ a purification mechanism 32, in addition to the condensed moisture collector 30, to purify, the condensed moisture for consumption or use, as in FIG. 6. For example, condensed water may be purified by passing it through a filter, such as a drip filter with activated charcoal and baking soda. It should be understood that the purification mechanism 32 may be any device or method which removes or neutralizes impurities to produce useful water. For example, the purification mechanism 32 may involve sedimentation, ultraviolet light, the use of chemicals (chlorine, bromine, iodine, hydrogen peroxide, silver, etc.), filtration through mediums or membranes, or oxidation.

Additional Uses/Embodiments

In considering alternatives related to the cooler 10, additional implementations may be understood to be related to two general categories, cooling-based uses and condensation-based uses. Though these two categories are described separately here, it is to be understood that features, elements, and steps of implementations in one category may be combined with features, elements, and steps of implementations in the other. The separation between the two general categories is only meant for illustrative purposes and is not meant to indicate that cooling does not occur in condensation-based uses or that condensation does not occur in cooling-based uses.

Cooling-Based Uses

In addition to the use of the first embodiment to cool the room of a house, the alternatives and additional features described, above may be utilized to create an embodiment useful for additional applications. In fact, FIG. 5 shows a cooler 10 being utilized to help keep the contents of an ice chest cold. Though the cooler 10 is designed to fit within the lid of an ice chest in FIG. 5, the first portion 14 may be disposed within any interior portion of the ice chest and the second portion may be disposed on any exterior portion of the ice chest, such as in a handle. Moreover, while the ice chest of FIG. 5 has rigid sides, the ice chest may be soft sided, like a lunch bag. Further, the cooler 10 may be utilized to cool campers, crawl spaces, building walls, tents, vehicle interiors, vehicle engines, vehicle exhausts, batteries, vehicle brakes, motors of electric vehicles, computer server rooms, and even solar panels.

The cooler 10, in another embodiment, may be used to keep a perishable product at a desired temperature. For example, it is recognized that a refrigerator often keeps butter at temperatures much lower than desired. The cooler 10, in such an embodiment, has a similar composition and arrangement to that of FIG. 5, but is utilized and designed to keep butter at a particular temperature, as in FIG. 10. Thereby, butter may be stored in an environment where it will not perish but will not be kept so cold that it's difficult to spread or otherwise use.

Further, in one embodiment the cooler 10 may be utilized to cool a hat or helmet, such as a safety hard hat or football helmet. In such an embodiment the first portion 14 is located inside the hat or helmet to absorb heat therefrom and the second portion 16 is located outside the hat or helmet to reject heat out and a small fan 20, such as a small aquarium-type air pump, powered by a battery or photovoltaic solar panel 38 may exchange vapor-enriched air 24 between the first portion 14 and second portion 16 to cool a wearer's head. In a similar embodiment, the cooler 10 may also be utilized within a piece of clothing, such as a jacket. Therein, a first portion 14 is located within the shirt or jacket and the second portion 16 is located outside to expel heat from a wearer's body outside the clothing, as in FIG. 15. Such an embodiment would be useful to provide cooling to firefighters, soldiers, and other individuals who have to wear bulky uniforms in warm climates. In certain embodiments, an opposite arrangement may be utilized with the hat or clothing to provide heat to a user's body rather than take it away. In each of the above embodiments, the cooler 10 may be used as the sole means for cooling or in tandem with other cooling devices.

Condensation-Based Uses

As briefly described above, the cooler 10 may be utilized to produce condensed water for a variety of different purposes. These purposes may include the production of generally impurity-free water and dehumidification of an area.

Production of Water

As described above, the cooler 10 may be utilized to produce condensed moisture from a nearby body of water—as in FIG. 9—or generally from water vapor in the local atmosphere. To facilitate condensation, portions of the cooler 10 may be integrated with or installed on or near portions of structures. For example, the cooler 10 may be integrated with a building to assist in the production of condensation along its windows or on portions of a canopy over a doorway. Additionally, the cooler 10 may also be integrated with other types of canopies, such as those that providing cover at gas-stations or over carports to assist in the production of condensation on portions thereof. Similarly, the cooler 10 may be integrated into signage, such as billboards and roadway markers, to help produce condensation along portions thereof. The cooler 10 could also be integrated into a solar panel array, whether the array is standalone or mounted upon a structure (as in FIG. 11), to assist the production of condensation along portions thereof. Also, the cooler 10 may be integrated, along a portion of the surface of a water tower or tank (as in FIG. 12) to assist the production of condensation thereupon too. Moreover, it is recognized that a collection of coolers 10 having condensed moisture collectors 30 may be located within an area so that their condensed moisture collectors 30 may be networked together to consolidate collected water for collection or removal as in FIG. 14. These collections may be referred to as "water farms," as they are analogous to other farms which produce products. In the embodiment shown in FIG. 14, a selection of the collection of coolers 10 is shown where each has a condensed moisture collector 30 beneath. In addition, in FIG. 14 those collectors 30 are connected together and to a spout by an angled pipe, so gravity may help direct the flow of the condensed moisture once it is collected.

Please note that the above examples only are provided to show a breadth of integrations with existing structures. These above examples should not be considered as a complete list of possibilities. Additionally, these examples are not meant to limit the cooler 10 to integration with existing structures. Indeed, the cooler 10 may be integrated with an additional panel or element provided specifically for the generation of condensation thereupon.

Once condensation is produced, this condensation may be removed directly—as with dehumidification, described in more detail below—applied directly to a use, or stored for a later use. In general, condensation may be applied directly for a use by arranging an element upon which condensation forms—be it a portion of the cooler 10 or a separate element—above and at an angle to the desired site of application, such as above a plant, so that condensation may flow off under the force of gravity and be applied directly to that site. For example, a cooler 10 may assist with the production of condensation along an element arranged above a plant to assist with watering that plant. In the alternative, the condensation that formed by the cooler 10 may be collected, as with the condensed moisture collector 30, to be stored for a later use. For example, water from a solar panel array installed at a house may be collected and stored to be integrated with that house's existing water supply to reduce their use of water from other sources, as in FIG. 11. Examples of integration may include introducing the collected moisture to an exterior rain barrel or an in-house reservoir specifically designed to feed into that home's water supply. The collected moisture may be passed through an additional purification mechanism 32 prior to its integration as well, if desired. Thereby, this collected moisture may be utilized to augment a house's, or even community's, water use from other sources. Similarly, condensed moisture collected from water tanks and towers may also be integrated to a municipal water supply or the like. For example, one or more coolers may be installed on top of a water tank having a rainwater reservoir on top so that condensed moisture from the coolers collects in the reservoir as in FIG. 12. This water then could be added to the tank or transported to another location for processing or use.

Dehumidification

As an alternative to the utilization of condensed moisture, the cooler 10 may also be utilized to assist with the dehumidification of an area by removal of water vapor from the air in an area. For example, a cooler 10 may be installed in a basement or crawl space. As the cooler 10 operates, moisture condensed on a portion of the cooler 10, or an element the cooler 10 is integrated with, may be collected into a condensed moisture collector 30 and removed from the basement area or crawl space as in FIG. 13. As moisture forms from operation of the cooler 10, moisture is removed from the air in that area, reducing the humidity.

Although the present invention has been described in considerable detail with possible reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features. Further, it is not necessary for all embodiments of the invention to have all the advantages of the invention or fulfill all the purposes of the invention.

In the present description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a claim, that feature can also be employed, to the extent possible, in aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

What is claimed is:

1. An evaporative cooler comprising:
   a conduit for carrying fluid forming a sealed loop and having a first portion disposed in a first space from which heat is absorbed and a second portion disposed in a second space into which heat is rejected;
   a volume of working fluid within said first portion of said conduit; and
   a fan disposed in fluid communication with the interior of said conduit, said fan forcing air to flow over said fluid accelerating evaporation thereof and creating vapor-enriched air containing heat from within said first space and forcing said vapor-enriched air into said second portion wherein heat from said vapor-enriched air is transferred to said second space before being returned to said first portion.

2. The evaporative cooler of claim 1, wherein said first portion of said conduit forms a vessel in which a portion of said working fluid is disposed.

3. The evaporative cooler of claim 1, further comprising a pad of moisture wicking material disposed within said conduit so said pad absorbs fluid and said fan forces air over said pad to accelerate evaporation.

4. The evaporative cooler of claim 1, wherein said working fluid consists of one the group of methanol, alcohol, acetone, ether, ethanol, isobutane, isopentane, water, and an aqueous ammonia solution.

5. The evaporative cooler of claim 1, wherein said first portion of said conduit is composed with a metal or an alloy.

6. The evaporative cooler of claim 1, further comprising at least one additional fan in fluid communication with said loop of said conduit.

7. The evaporative cooler of claim 1, wherein said conduit has a smooth inner surface and ribbed texture outer surface.

8. The evaporative cooler of claim 1, wherein said first space is within a structure and said second space is outside said structure.

9. The evaporative cooler of claim 1, wherein said first space is in said structure and said second space is in a separate portion of said structure.

10. The evaporative cooler of claim 1, further comprising a condensed moisture collector to collect moisture from an outer portion of said evaporative cooler.

11. The evaporative cooler of claim 10, further comprising a purification mechanism operatively connected to said moisture collector for purifying said condensed moisture collected.

12. The evaporative cooler of claim 10, wherein a portion of said cooler is disposed adjacent a body of impurity-filled water so said moisture collected contains vapor from said body of water and said moisture collected is impurity-free.

13. The evaporative cooler of claim 12, wherein said impurity in said body of impurity-filled water comprises salt.

14. The evaporative cooler of claim 1, wherein said second portion of said conduit is disposed in a location selected from the group consisting of underground, underwater, and within a shaded area.

15. The evaporative cooler of claim 1, wherein said conduit is disposed within the lid of an ice chest.

16. The evaporative cooler of claim 1, further including fins disposed along a portion of the outer surface of said conduit.

17. The evaporative cooler of claim 1, wherein said fan is solar-powered.

18. The evaporative cooler of claim 1, wherein said fan is controlled by a controller selected from the group consisting of a timer, thermostat hygrometer, and programmable logic controller device.

19. The evaporative cooler of claim 1, further including a heat exchange enhancer operatively connected to one or both of said first portion and second portion to accelerate the transfer of heat wherein said heat exchange enhancer is selected from the group consisting of a second fan, fins, spikes, dimples, ribbed portions, ribbons and an additional thermal heat exchanger.

20. The evaporative cooler of claim 1, further including thermal insulation surrounding segments of said conduit.

* * * * *